(12) United States Patent
Schulz

(10) Patent No.: US 7,397,225 B2
(45) Date of Patent: Jul. 8, 2008

(54) APPARATUS FOR CONTROLLING THE POWER OF AN AC VOLTAGE SUPPLYING AN ELECTRICAL CONSUMER BY PHASE CONTROL AND METHOD FOR REDUCING HARMONICS

(75) Inventor: Detlef Schulz, Altenriet (DE)

(73) Assignee: Gerhard Kurz, Althengstett (DE)

( * ) Notice: Subject to any disclaimer, the term of this patent is extended or adjusted under 35 U.S.C. 154(b) by 0 days.

(21) Appl. No.: 11/054,414

(22) Filed: Feb. 9, 2005

(65) Prior Publication Data

US 2005/0189929 A1 Sep. 1, 2005

Related U.S. Application Data

(63) Continuation of application No. PCT/EP03/008966, filed on Aug. 13, 2003.

(30) Foreign Application Priority Data

Aug. 14, 2002 (DE) ................. 102 37 983

(51) Int. Cl.
*H02J 3/12* (2006.01)
*G05F 1/455* (2006.01)
(52) U.S. Cl. .................... 323/239; 363/39
(58) Field of Classification Search ......... 323/237–246, 323/320, 324; 363/39, 40; 307/141, 141.4
See application file for complete search history.

(56) References Cited

U.S. PATENT DOCUMENTS 3,764,822 A * 10/1973 Ebbinge et al. ............. 307/141
4,353,025 A * 10/1982 Dobkin ...................... 323/300
4,954,768 A * 9/1990 Luchaco et al. ............. 323/300
4,992,709 A * 2/1991 Griffin ....................... 318/249
5,444,359 A * 8/1995 Riggio ....................... 323/237
5,719,493 A * 2/1998 Higashi et al. .............. 219/216
5,747,973 A * 5/1998 Robitaille et al. ........... 323/239

FOREIGN PATENT DOCUMENTS

| DE | 21 31 750 | 12/1972 |
| DE | 43 05 882 A1 | 9/1994 |
| DE | 198 50 905 | 5/2000 |
| DE | 199 04 615 A1 | 8/2000 |
| EP | 0 859 452 A1 | 8/1998 |

* cited by examiner

*Primary Examiner*—Gary L Laxton
(74) *Attorney, Agent, or Firm*—Harness, Dickey & Pierce, P.L.C.

(57) ABSTRACT

An apparatus for controlling the power of an AC voltage supplying an electrical consumer (14) by phase control and for reducing harmonics caused by said phase control, particularly within a range of 4 kHz, preferably within a range of the third harmonic, comprising a first switching element (12) (TRIAC) connected in series with the consumer (14) and driven by a control device (20) for performing a phase control. A second switching element (34) connected in series with a resistor element (32) is provided in parallel to the first switching element (12). The control device (20) is adapted to drive the second switching element (34) shortly before the first switching element (12) into its conducting state for a short time period.

7 Claims, 1 Drawing Sheet

APPARATUS FOR CONTROLLING THE POWER OF AN AC VOLTAGE SUPPLYING AN ELECTRICAL CONSUMER BY PHASE CONTROL AND METHOD FOR REDUCING HARMONICS

CROSSREFERENCES TO RELATED APPLICATIONS

This application is a continuation of co-pending international patent application PCT/EP2003/008966, filed on Aug. 13, 2003 and designating U.S., which claims priority of German patent application DE 102 37 983, filed on Aug. 14, 2002.

BACKGROUND OF THE INVENTION

1. Field of the Invention

The present invention relates to an apparatus for controlling the power of an AC voltage supplying an electrical consumer by phase control and for reducing harmonics caused by said phase control, particularly within a range of 4 kHz, preferably within a range of the third harmonic, comprising a first switching element connected in series with said consumer and driven by a control device for performing phase control. The invention further relates to a method for reducing harmonics in the range of 4 kHz, preferably in the range of the third harmonic, in a power control performing a phase control.

2. Related Prior Art

An apparatus and a method for power control by means of phase control and phase adjustment, respectively, is for example known from the application DE 198 50 905 A1 of the present applicant. Devices for phase control serve to control the power supplied to an electric consumer by periodically switching the consumer on and off by means of a switching element. Typically, a TRIAC is used as the switching element, which is connected in series with the consumer and which is fired via a control unit.

The control unit comprises a series connection of a resistor and a firing capacitor, the series connection being provided parallel to the TRIAC. The firing signal is tapped off between the resistor and the firing capacitor and is supplied to the control input (gate) of the TRIAC via a series connection of a resistor and a firing element in form of a DIAC. Beside these analogue designed control devices, also integrated circuits are nowadays available which perform this driving function.

The power control via phase control of the AC voltage supplied to the consumer causes undesired harmonics, and there are European standards regulating the level of such harmonics. These standards have to be fulfilled by the power control apparatuses which is the reason why approaches for reducing these harmonics have been proposed in the past.

When reducing the harmonics, particularly the third harmonic plays a special role, therefore, former approaches have concentrated to reduce the third harmonic. An example of an apparatus for reducing the third harmonic is for example disclosed in EP 0 859 452 B1 of the present applicant. In the solution disclosed therein, the phase angle and firing angle, respectively, is changed by the control device around a predetermined value in succeeding full waves. Such an asymmetry in the firing angle results in only slowly increasing even numbered harmonics and highly reduced odd numbered harmonics.

An approach for suppressing noise in a control circuit performing phase control is e.g. disclosed in DE 21 31 750 A.

Further circuits performing phase control a disclosed in DE 199 04 615 A1 or DE 43 05 882 A1.

Although the above mentioned approach proved successful in practise and allows to meet the existing standards readily, of course it further exists the request for finding a solution even less expensive. Moreover an apparatus would be desirable, the hum of which is slightly reduced in the range of 25 Hz compared to the apparatus shown in the mentioned document.

SUMMARY OF THE INVENTION

In view of the above it is an object of the present invention to provide an apparatus for power control by phase control, which may be manufactured at a reasonable price and which has an improved hum performance.

This object is solved with the apparatus mentioned above by providing a second switching element connected in series with a resistor element, the series connection being parallel to the first switching element, and by adapting the control device such that it drives the second switching element shortly before the first switching element and switches it in its conducting state for a short time period.

That is in other words that caused by prior switching the second switching element into the conducting state, a current flows which is taken over by the first switching element after its firing. Caused by the resistor element, the current passing through the second switching element is less than the current passing through the first switching element. Altogether, by means of the second switching element a softer increase of the current in total may be achieved so that the harmonics caused thereby are reduced. Particularly, switching the second switching element on generates harmonics which partially extinguish harmonics occurring upon firing the second switching element.

Due to the few additional components which are necessary for the apparatus for power control according to the present invention, manufacturing costs may be saved, however, without deteriorating the quality with respect to the reduction of harmonics.

Generally, the present invention is based on the idea to have an amount of current flow before the actual firing procedure and the switching on of the TRIAC, the amount of current being smaller than the real current flowing through the first switching element. Due to that, as mentioned before, further harmonics are generated previously which harmonics partially extinguish harmonics caused during the real phase control.

Preferably, a TRIAC is used as a switching element. It is further preferred that the resistor element is provided as a simple ohmic resistor. Of course other resistor elements may also be used, for example inductive or capacitive resistors. However, it has been proven that ohmic resistors are suitable well with respect to their dimensions and costs.

The object underlying the present invention is also solved by a method for reducing harmonics in the range of 4 kHz, preferably the third harmonic, in a power control performing a phase control, wherein the method comprising the steps:

driving a first switching element on the basis of a first predetermined firing angle, as to perform a phase control method;

shortly switching a connection into a conducting state before firing the first switching element, said connection having a resistance and bridging said first switching element.

As described before, a TRIAC is used as the switchable connection having a resistance which is connected in series with an ohmic resistor parallel to the first switching element.

It is to be understood that the features mentioned above and those yet to be explained below can be used not only in the respective combinations indicated but also in other combinations or in isolation, without leaving the scope of the present invention.

BRIEF DESCRIPTION OF THE FIGURES

The invention will now be described in detail on the basis of an embodiment with reference to the drawing. In the drawings.

DESCRIPTION OF PREFERRED EMBODIMENTS

Figure 1:
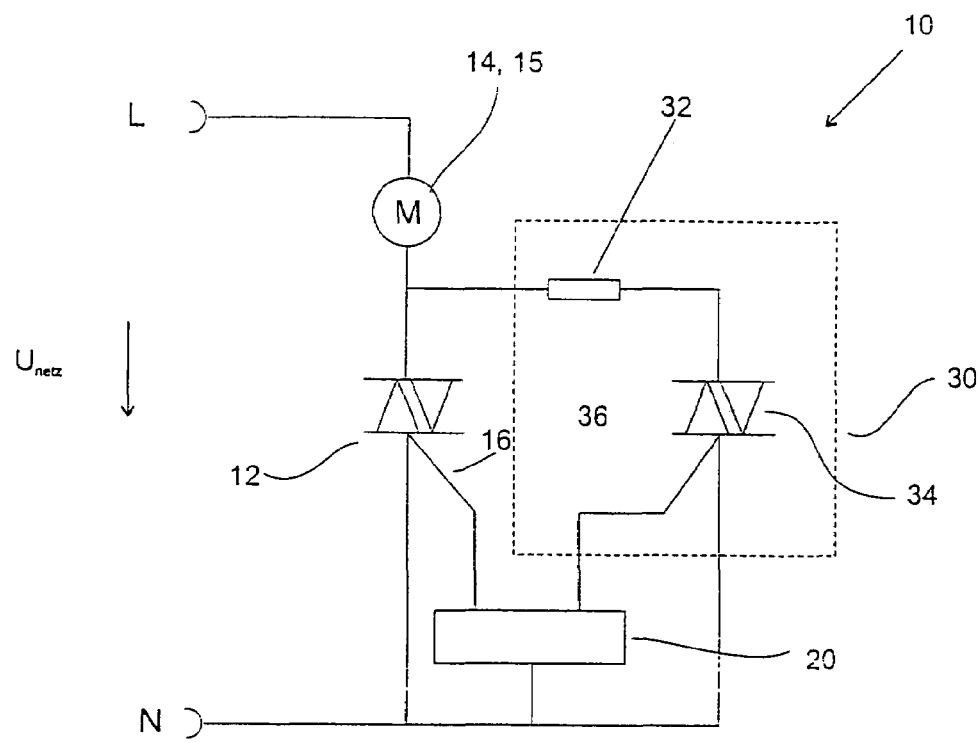
FIG. 1 shows a schematic block diagram of an apparatus for power control according to the present invention.

In FIG. 1, an apparatus for power control is shown and indicated with reference numeral 10. The power control is performed by a phase control method which is generally known and has not to be described again here.

For performing the phase control, the apparatus 10 comprises a TRIAC 12 which is connected in series with the consumer 14 to be controlled. The series connection of TRIAC 12 and consumer 14 is supplied by an AC voltage supply $U_{netz}$, wherein both electric poles are indicated with L and N.

In the present embodiment the consumer 14 is provided as a motor 15 which represents an inductive load.

The TRIAC 12 is connected with a control unit 20 via its control input (gate) 16), which control unit 20 generates respective firing pulses corresponding to the desired power and supplies these pulses to the control terminal 16.

This control device 20 may either be provided as a discrete circuit, comprising for example a firing capacitor for generating the firing pulses. Of course, the control device may also be provided as an integrated circuit.

The firing pulses causes the TRIAC 12 to switch in a conducting state so that the consumer 14 may be supplied with power. The TRIAC 12 remains conductive until the end of the half wave of the supply voltage and switches then in the non-conductive state. By a respective selection of the firing time within a half wave of the supply voltage it is possible to control the power.

With this kind of power control harmonics are generated acting back into the AC voltage supply network. Due to European standards these harmonics may not exceed predetermined values. It is therefore necessary to take measures for reducing these harmonics.

Figure 2:
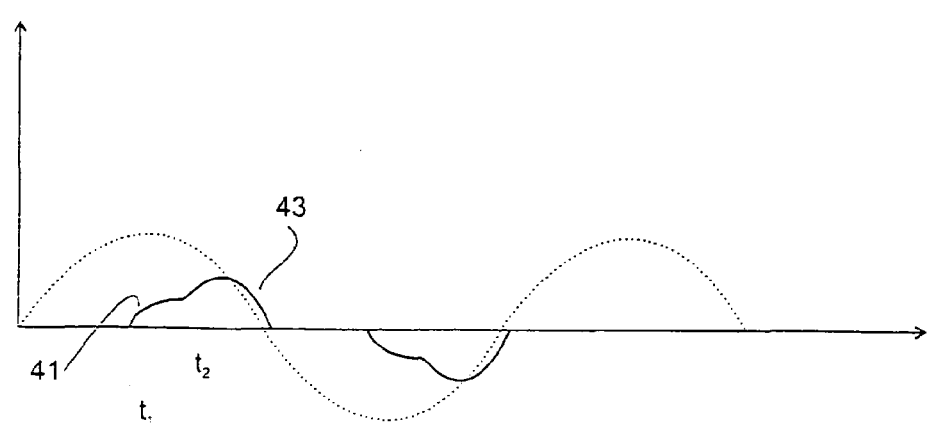
FIG. 2 shows a diagram for illustrating the voltage-and current time curves.

In the apparatus 10, a switching unit 30 is therefore provided. This switching unit 30 has the task to cause an amount of current to be passed through the consumer 14 before the real firing time instant, which amount of current is less than the real nominal current. In FIG. 2, this amount of current is indicated with reference numeral 41. It is clearly shown that this amount of current 41 starts flowing before the real flowing current after firing the TRIAC which is indicated with reference numeral 43. The time difference between the instant t1 of the smaller amount of current 41 and the instant t2 of the nominal current 43 is about 1-2 ms and may be varied dependent on the firing angle. Particularly, the difference may be set to zero with very small and/or with very high firing angles having the result that the switching unit 30 remains ineffective.

By means of a small amount of current 41 flowing before the real nominal current 43, a total current passing through the consumer 14 is generated, which rise is significantly flatted. This flattening has the effect that the generation of harmonics is reduced, particularly by destructive interference of the harmonics which are assigned to the amount of current 41 and the nominal current 43.

Altogether, this type of control is able to reduce the lower harmonics and particularly the third harmonic here.

The function of the switching unit 30 is achieved in the present embodiment by a series connection of a resistor 32 and a TRIAC 34, which series connection is arranged parallel to the TRIAC 12. Hence, a current path between a terminal of the supply voltage via the consumer 14, the resistor 32 and the TRIAC 34 to the second terminal N is formed when the TRIAC 34 is in the conducting state. In this case, the TRIAC 12 is bypassed.

The TRIAC 34 is driven also by the control unit 20, which supplies firing pulses to the control input 36 (gate) of the TRIAC 34. As mentioned before, this firing pulse is generated at the instant t1, which lies before the instant t2 of the real firing pulse supplied to the TRIAC 12. The respective difference t2–t1 may be a fixed value or may be adjusted by the control unit 20 dependent on the firing angle of the firing pulses to the TRIAC 12.

The resistor 32 provided in the switching unit 30 is preferably an ohmic resistor and serves to keep the current 41 below the amount of the nominal current 43. A resistor having a resistance in the range of for example 10 Ohm has been proven as particularly suitable. However, it is to be noted that the limitation of the current 41 may be achieved differently and with different components.

As already mentioned before, the TRIAC 12 is bypassed shortly before its firing through the switching unit 30, so that a current may pass through the consumer 14. This procedure is periodically repeated every half wave of the supply voltage.

It has been shown that a reduction of harmonics is possible with a very simple and cost effective switching unit 30 so that the existing standards may be met. Furthermore, it has been shown that the humming noise which occurs with prior switching units for reducing harmonics, may be substantially reduced.

What is claimed is:

1. Apparatus for controlling the power of an AC voltage supplying an electrical consumer by phase control and for reducing mainly the third harmonic caused by said phase control, comprising a first switching element (TRIAC) connected in series with said consumer and driven at a first firing angle into a conducting state by a control device for performing a phase control of said consumer during a given half cycle of the AC supply voltage, characterized in that a second switching element and a resistor element are provided, both being electrically connected in series to form a series connection, said series connection is provided parallel to the first switching element, said control device being adapted to drive the second switching element at a second firing angle into a conducting state at a first point in time (t1) during said given half cycle that is shortly before a second point in time (t2) when the first switching element is driven into the conducting state.

2. Apparatus of claim 1, characterized in that the second switching element is a TRIAC.

3. Apparatus of claim 1, characterized in that the resistor element is an ohmic resistor.

4. Apparatus of claim 2, characterized in that the resistor element is an ohmic resistor.

5. Apparatus of claim 1, wherein the control device is further adapted to automatically vary the difference in time (t2-t1) in accordance with said first firing angle of the first switching element.

6. Apparatus of claim 1, wherein said control device is further adapted to independently control the first point in time (t1) and the second point in time (t2).

7. Apparatus of claim 1, wherein the current conducted by said second switching element after time (t2) is less than the current conducted by said first switching element after time (t2).

* * * * *